(12) United States Patent
Najafi et al.

(10) Patent No.: US 11,313,719 B2
(45) Date of Patent: Apr. 26, 2022

(54) PHOTON NUMBER RESOLVING SUPERCONDUCTING DETECTOR

(71) Applicant: PSIQUANTUM CORP., Palo Alto, CA (US)

(72) Inventors: Faraz Najafi, Palo Alto, CA (US); Eric Dudley, Palo Alto, CA (US); Mark Thompson, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 0 days.

(21) Appl. No.: 16/623,503

(22) PCT Filed: Apr. 30, 2019

(86) PCT No.: PCT/US2019/030019
§ 371 (c)(1),
(2) Date: Dec. 17, 2019

(87) PCT Pub. No.: WO2019/213147
PCT Pub. Date: Nov. 7, 2019

(65) Prior Publication Data
US 2020/0256722 A1    Aug. 13, 2020

Related U.S. Application Data

(60) Provisional application No. 62/665,491, filed on May 1, 2018.

(51) Int. Cl.
*G01J 1/44* (2006.01)
*G01J 1/04* (2006.01)

(52) U.S. Cl.
CPC .............. *G01J 1/44* (2013.01); *G01J 1/0407* (2013.01); *G01J 2001/4446* (2013.01)

(58) Field of Classification Search
CPC .... G01J 1/44; G01J 1/0407; G01J 2001/4446; G01F 23/24
See application file for complete search history.

(56) References Cited

U.S. PATENT DOCUMENTS 3,059,196 A    10/1962 Lentz
3,119,076 A    1/1964 Schlig et al.
(Continued)

FOREIGN PATENT DOCUMENTS

CN    106289515 A    1/2017
CN    106549099       3/2017
(Continued)

OTHER PUBLICATIONS

Akhlaghi et al., "Gated Mode Superconducting Nanowire Single Photon Detectors," Optics Express, vol. 20, No. 2, Jan. 16, 2012, 9 pgs.
(Continued)

*Primary Examiner* — Seung C Sohn
(74) *Attorney, Agent, or Firm* — Morgan, Lewis & Bockius LLP

(57) ABSTRACT

A photon detector is provided. The photon detector includes a superconducting wire having a plurality of alternating narrow and wide portions; a current source electrically-coupled to the superconducting wire and configured to supply the superconducting wire with electrical current; and an optical waveguide optically coupled to the plurality of narrow portions of the superconducting wire.

45 Claims, 7 Drawing Sheets

(56) References Cited

U.S. PATENT DOCUMENTS

| | | | |
|---|---|---|---|
| 3,283,282 A | 11/1966 | Rosenberg | |
| 4,336,561 A | 6/1982 | Murphy | |
| 4,365,317 A | 12/1982 | Gheewala | |
| 4,509,146 A | 4/1985 | Wang et al. | |
| 4,647,954 A | 3/1987 | Graf et al. | |
| 4,989,051 A | 1/1991 | Whitehead et al. | |
| 5,026,682 A | 6/1991 | Clark et al. | |
| 5,030,614 A | 7/1991 | Hollander et al. | |
| 5,030,617 A | 7/1991 | Legge | |
| 5,041,880 A | 8/1991 | Nojima et al. | |
| 5,051,787 A | 9/1991 | Hasegawa | |
| 5,053,383 A | 10/1991 | Short et al. | |
| 5,127,928 A | 7/1992 | Farries et al. | |
| 5,173,620 A | 12/1992 | Fujimaki et al. | |
| 5,219,826 A | 6/1993 | Kapitulnik | |
| 5,247,475 A | 9/1993 | Hasunuma et al. | |
| 5,321,004 A | 6/1994 | Perez et al. | |
| 5,365,476 A | 11/1994 | Mukhanov | |
| 5,376,626 A | 12/1994 | Drehman et al. | |
| 5,455,519 A | 10/1995 | Ohori | |
| 5,481,119 A | 1/1996 | Higashino et al. | |
| 5,521,862 A | 5/1996 | Frazier | |
| 5,574,290 A | 11/1996 | You | |
| 5,719,105 A | 2/1998 | Odagawa et al. | |
| 5,825,240 A | 10/1998 | Geis et al. | |
| 5,831,278 A | 11/1998 | Berkowitz | |
| 5,892,644 A | 4/1999 | Evans | |
| 5,925,892 A | 7/1999 | Mizuno et al. | |
| 6,029,075 A | 2/2000 | Das et al. | |
| 6,078,517 A | 6/2000 | Herr | |
| 6,242,939 B1 | 6/2001 | Nagasawa | |
| 6,433,974 B2 | 8/2002 | Heismann | |
| 6,774,463 B1 | 8/2004 | Chaudhari et al. | |
| 7,227,438 B2 | 6/2007 | Song et al. | |
| 7,513,765 B2 | 4/2009 | Liao | |
| 7,558,030 B2 | 7/2009 | Lee et al. | |
| 7,589,323 B2 | 9/2009 | Tanaka et al. | |
| 7,724,083 B2 | 5/2010 | Herring et al. | |
| 7,847,282 B2 | 12/2010 | Sandhu | |
| 7,852,106 B2 | 12/2010 | Herr et al. | |
| 8,330,145 B2 | 12/2012 | Wakana et al. | |
| 8,565,844 B2 | 10/2013 | Smith | |
| 8,577,430 B1 | 11/2013 | Smith | |
| 8,736,085 B2* | 5/2014 | Sines | H02N 11/002 290/1 R |
| 9,293,240 B2 | 3/2016 | Flex-Cable | |
| 9,443,576 B1 | 9/2016 | Miller | |
| 9,500,519 B2* | 11/2016 | Tang | G02B 6/0229 |
| 9,509,315 B2 | 11/2016 | McCaughan et al. | |
| 9,853,645 B1 | 12/2017 | Mukhanov et al. | |
| 9,876,505 B1 | 1/2018 | Dai et al. | |
| 9,954,158 B2* | 4/2018 | You | G01J 1/0488 |
| 9,998,122 B2 | 6/2018 | Hamilton et al. | |
| 10,103,736 B1 | 10/2018 | Powell et al. | |
| 10,133,986 B1* | 11/2018 | Newton | G06F 17/11 |
| 10,171,086 B2 | 1/2019 | McCaughan et al. | |
| 10,177,298 B1 | 1/2019 | Taylor et al. | |
| 10,186,858 B2 | 1/2019 | Klaus et al. | |
| 10,197,440 B2 | 2/2019 | Najafi | |
| 10,262,776 B2 | 4/2019 | Choi et al. | |
| 10,361,703 B2 | 7/2019 | Najafi | |
| 10,386,229 B2 | 8/2019 | Najafi et al. | |
| 10,396,733 B2 | 8/2019 | Najafi et al. | |
| 10,454,014 B2 | 10/2019 | Najafi et al. | |
| 10,454,016 B2* | 10/2019 | Fong | H01L 39/22 |
| 10,566,516 B2 | 2/2020 | Najafi | |
| 10,573,800 B1 | 2/2020 | Najafi | |
| 10,586,910 B2 | 3/2020 | Najafi | |
| 10,620,044 B2 | 4/2020 | Thompson et al. | |
| 10,879,905 B2 | 12/2020 | Najafi et al. | |
| 10,897,235 B2 | 1/2021 | Najafi et al. | |
| 10,911,031 B2 | 2/2021 | Wise et al. | |
| 10,944,403 B2 | 3/2021 | Najafi | |
| 11,009,387 B2 | 5/2021 | Chung et al. | |
| 2002/0149453 A1 | 10/2002 | Snitchler et al. | |
| 2003/0087503 A1 | 5/2003 | Sakaguchi et al. | |
| 2005/0153843 A1 | 7/2005 | Kubota | |
| 2005/0197254 A1 | 9/2005 | Stasiak et al. | |
| 2006/0073979 A1 | 4/2006 | Thieme et al. | |
| 2006/0183327 A1 | 8/2006 | Moon | |
| 2006/0270224 A1 | 11/2006 | Song et al. | |
| 2008/0026234 A1 | 1/2008 | Sambasivan et al. | |
| 2008/0197285 A1 | 8/2008 | Frey et al. | |
| 2008/0272302 A1 | 11/2008 | Frey et al. | |
| 2009/0014433 A1 | 1/2009 | O'Neil et al. | |
| 2010/0026447 A1 | 2/2010 | Keefe et al. | |
| 2010/0171098 A1 | 7/2010 | Suzuki | |
| 2011/0108803 A1 | 5/2011 | Deligianni et al. | |
| 2011/0116742 A1 | 5/2011 | Chang et al. | |
| 2011/0254053 A1 | 10/2011 | Goupil et al. | |
| 2013/0012392 A1 | 1/2013 | Tanaka et al. | |
| 2013/0090244 A1 | 4/2013 | Shinzato et al. | |
| 2013/0124112 A1 | 5/2013 | Heath et al. | |
| 2013/0143744 A1 | 6/2013 | Marsili et al. | |
| 2013/0341594 A1 | 12/2013 | Mohseni et al. | |
| 2014/0113828 A1 | 4/2014 | Gilbert et al. | |
| 2014/0299751 A1 | 10/2014 | Tang et al. | |
| 2015/0018218 A1 | 1/2015 | Lakrimi et al. | |
| 2015/0179916 A1 | 6/2015 | Pramanik et al. | |
| 2015/0348681 A1 | 12/2015 | Huh | |
| 2016/0028402 A1 | 1/2016 | McCaughan et al. | |
| 2016/0356708 A1 | 12/2016 | Bennett et al. | |
| 2017/0186933 A1 | 6/2017 | Sunter et al. | |
| 2018/0033944 A1 | 2/2018 | Ladizinsky et al. | |
| 2018/0145664 A1 | 5/2018 | Herr et al. | |
| 2018/0335343 A1 | 11/2018 | Najafi et al. | |
| 2018/0364097 A1 | 12/2018 | Najafi | |
| 2018/0374979 A1 | 12/2018 | Nozawa | |
| 2019/0027672 A1 | 1/2019 | Egrant | |
| 2019/0035904 A1 | 1/2019 | Najafi | |
| 2019/0035999 A1 | 1/2019 | Najafi | |
| 2019/0044051 A1 | 2/2019 | Caudillo et al. | |
| 2019/0109595 A1 | 4/2019 | Najafi | |
| 2019/0227230 A1 | 7/2019 | Novack et al. | |
| 2019/0288132 A1 | 9/2019 | Wang et al. | |
| 2019/0378874 A1 | 12/2019 | Rosenblatt | |
| 2020/0066962 A1 | 2/2020 | Najafi | |
| 2020/0080890 A1 | 3/2020 | Najafi et al. | |
| 2020/0111944 A1 | 4/2020 | Moodera et al. | |
| 2020/0176662 A1 | 6/2020 | Dayton et al. | |
| 2020/0194656 A1 | 6/2020 | Najafi | |
| 2020/0256722 A1 | 8/2020 | Najafi et al. | |
| 2021/0183767 A1 | 6/2021 | Najafi et al. | |
| 2021/0239518 A1 | 8/2021 | Chung et al. | |

FOREIGN PATENT DOCUMENTS

| | | |
|---|---|---|
| DE | 244057661 B1 | 1/1976 |
| DE | 19714191 C1 | 7/1998 |
| EP | 0299879 A2 | 1/1989 |
| EP | 1965184 A1 | 9/2008 |
| GB | 2530500 A | 3/2016 |
| JP | S 63299282 A | 12/1988 |
| JP | H 05-55647 A | 3/1993 |
| WO | WO 90/14715 A1 | 11/1990 |
| WO | WO 94/09566 A1 | 4/1994 |
| WO | WO/2012052628 A1 | 4/2012 |

OTHER PUBLICATIONS

Atikian, Haig A. et al., "Superconducting Nanowire Single Photon Detector on Diamond," arXiv:1401.4490v1, physics.optics, Jan. 17, 2014, 5 pgs.

Cheng, Risheng et al., "Photon-Number Resolving Detector Based on Superconducting Serial Nanowires," IEEE Transactions on Applied Superconductivity, vol. 23, No. 1, Feb. 2013, 9 pgs.

Clem, John R. et al., "Geometry-dependent critical currents in superconducting nanocircuits," arXiv:1109.4881 [cond-mat.supr-con] Sep. 2011, 29 pgs.

Dai, Daoxin et al., "Mode conversion in tapered submicron silicon ridge optical waveguides," Optics Express, vol. 20, No. 12, Jun. 4, 2012, 15 pgs.

(56) References Cited

OTHER PUBLICATIONS

Henrich, D. et al., "Geometry-inducted reduction of the critical current in superconducting nanowires," arXiv:1204.0616v2 [cond-mat-supr-con] Aug. 22, 2012, 6 pgs.
Hortensius, H.L. et al., "Critical-Current Reduction in Thin Superconducting Wires Due to Current Crowding," arXiv:1203.4253v3, [cond-mat-supr-con], May 6, 2012, 5 pgs.
Korzh, B.A. et al., "Demonstrating sub-3 ps temporal resolution in a superconducting nanowire single-photon detector," Apr. 18, 2018, 26 pgs.
Lee, S.-B. et al., "Fabrication of a self-aligned superconducting nanotransistor based NOR logic gate," Microelectronic Engineering 57-58, 2001, 7 pgs., downloaded from https://www.sciencedirect.com/science/article/abs/pii/S0167931701004269).
Marsili, F., "Single-photon detectors based on ultra-narrow superconducting nanowires," Massachusetts Institute of Technology, Department of Electrical Engineering and Computer Science, Dec. 19, 2010, 31 pgs.
Mattioli, Francesco et al., "Photon-number resolving superconducting nanowire detectors," Superconductor Science and Technology, Aug. 24, 2015, 16 pgs.
McGaughan, "Superconducting thin film nanoelectronics," Sep. 2015, Massachusetts Institute of Technology, submitted to the Department of Electrical Engineering and Computer Science in partial fulfillment of the requirements for the degree of Doctor of Philosopy in Electrical Engineering, 22 pgs.
Murphy et al., "Nanoscale superconducting memory based on the kinetic inductance of asymmetric nanowire loops," Departmwent of Physics, University of Illinois at Urbana-Champaign, arXiv:1701.08715v2 [cond-mat.supr-con] Jun. 29, 2017, 19 pgs.
Natarajan et al., "Superconducting nanowire single-photon detectors: physics and applications", 2012, Superconduc. Sci. Technology vol. 25, p. 063001.
Quaranta et al., Superconductive Three-Terminal Amplifier/Discriminator, IEEE Transactions on Applied Superconductivity, vol. 19, No. 3, Jun. 2, 2009, 4 pgs.
Schmidt, E. et al., AIN-Buffered Superconducting NbN Nanowire Single-Photon Detector on GaAs, IEEE Transactions on Applied Superconductivity, vol. 27, No. 4, Jun. 2017, 5 pgs.
Shiino, Tatsuya et al., "Improvement of Critical Temperature of Superconducting NbTiN and NbN Thin Films Using the AIN Buffer Layer," Superconductor Science and Technology, Mar. 2010, 11 pgs.
Zhao, Qing-Yuan et al., "A compact superconducting nanowire memory element operated by nanowire cryotrons," Massachusetts Institute of Technology, Department of Electrical Engineering and Computer Science, Nov. 22, 2017, 20 pgs.
PsiQuantum Corp., International Search Report and Written Opinion, PCT/US2018/033042, dated Aug. 28, 2018, 13 pgs.
PsiQuantum Corp., International Search Report and Written Opinion, PCT/US2018/033041, dated Jul. 27, 2018, 16 pgs.
PsiQuantum Corp., International Search Report and Written Opinion, PCT/US2018/044091, dated Nov. 7, 2018, 13 pgs.
PsiQuantum Corp., Invitation to Pay Additional Fees/Partial Search Report, PCT/US2018/037892, dated Aug. 20, 2018, 12 pgs.
PsiQuantum Corp., Invitation to Pay Additional Fees/Partial Search Report, PCT/US2018/054414, dated Jan. 24, 2019, 21 pgs.
PsiQuantum Corp., International Search Report and Written Opinion, PCT/US2018/054414, dated Mar. 20, 2019, 21 pgs.
Najafi, Office Action dated Dec. 12, 2018, U.S. Appl. No. 16/028,288, 6 pgs.
Najafi, Notice of Allowance dated Apr. 5, 2019, U.S. Appl. No. 16/028,288, 10 pgs.
Najafi, Office Action dated Sep. 21, 2018, U.S. Appl. No. 16/028,293, 8 pgs.
Najafi, Final Office Action dated Mar. 1, 2019 U.S. Appl. No. 16/028,293, 5 pgs.
Najafi, Notice of Allowance dated Sep. 21, 2018, U.S. Appl. No. 16/012,520, 9 pgs.
Najafi, Office Action, U.S. Appl. No. 16/136,124, dated Apr. 4, 2019, 9 pgs.
Quayle Office Action, U.S. Appl. No. 16/151,180, dated Jan. 31, 2019, 5pgs.
Najafi, Notice of Allowace, U.S. Appl. No. 16/151,180, dated Mar. 14, 2019, 5 pgs.
Najafi, Notice of Allowance U.S. Appl. No. 16/151,190, dated Feb. 6, 2019, 11 pgs.
Najafi, Notice of Allowance U.S. Appl. No. 16/046,815, dated Mar. 28, 2019, 5 pgs.
Najafi, Office Action, U.S. Appl. No. 16/046,815, dated Feb. 4, 2019, 9 pgs.
Najafi, Office Action, U.S. Appl. No. 16/046,807, dated Mar. 18, 2019, 10 pgs.
Najafi, Office Action, U.S. Appl. No. 16/107,143, dated Mar. 19, 2019, 11 pgs.
PsiQuantum Corp., International Search Report and Written Opinion, PCT/US2019/017687, dated Apr. 30, 2019, 8 pgs.
Stanfield, CMOS-Compatible, Piezo-Optomechanically Tunable Photonics for Visible Wavelengths and Cryogenic, Temperatures, vol. 27, issue 20, p. 28588-28605, 2019.
PsiQuantum Corp., International Search Report, PCT/US2019/017691, dated Apr. 23, 2019, 7 pgs.
PsiQuantum Corp., PCT/US2018/044091, International Preliminary Report on Patentability, dated Jan. 28, 2020, 6 pgs.
Chung, Non-Final Office Action, U.S. Appl. No. 16/849,829, dated Aug. 21, 2020, 5 pgs.
Chung, Notice of Allowance, U.S. Appl. No. 16/849,829, dated Dec. 8, 2020, 5 pgs.
PsiQuantum Corp., International Search Report / Written Opinion, PCT/US20/28519, dated Jan. 12, 2021, 9 pgs.
PsiQuantum Corp., Notice of Allowance, U.S. Appl. No. 16/664,716, dated Jan. 28, 2021, 8 pgs.
PsiQuantum Corp., Notice of Allowance, U.S. Appl. No. 16/473,547, dated Jan. 27, 2021, 2 pgs.
PsiQuantum Corp., Notice of Allowance, U.S. Appl. No. 16/543,256, dated Feb. 4, 2021, 2 pgs.
PsiQuantum Corp., Notice of Allowance, U.S. Appl. No. 16/544,718, dated Mar. 12, 2021, 2 pgs.
PsiQuantum, Notice of Allowance, U.S. Appl. No. 16/840,166, dated Mar. 23, 2021, 7 pgs.
PsiQuantum, Notice of Allowance, U.S. Appl. No. 16/544,718, dated Apr. 26, 2021, 2 pgs.
PsiQuantum, Notice of Allowance, U.S. Appl. No. 16/664,716, dated Apr. 21, 2021, 8 pgs.
PsiQuantum, Notice of Allowance, U.S. Appl. No. 16/664,716, dated May 7, 2021, 2 pgs.
PsiQuantum, Notice of Allowance, U.S. Appl. No. 16/543,256, dated Mar. 24, 2021, 2 pgs.
PsiQuantum, Notice of Allowance, U.S. Appl. No. 16/575,274, dated Apr. 22, 2021, 10 pgs.
PsiQuantum, International Preliminary Report on Patentability, PCT/US2018/033042, dated Nov. 19, 2019, 7 pgs.
PsiQuantum, International Search Report, PCT/US2018/033041, dated Jul. 27, 2018, 12 pgs.
PsiQuantum, International Preliminary Report on Patentability, PCT/US2019/051853, dated Mar. 23, 2021, 10 pgs.
PsiQuantum, International Preliminary Report on Patentability, PCT/US2019/017687, dated Aug. 18, 2020, 6 pgs.
PsiQuantum, International Preliminary Report on Patentability, PCT/US2019/030019, dated Nov. 3, 2020, 7 pgs.
PsiQuantum Corp., Notice of Allowance, U.S. Appl. No. 16/849,829, dated Mar. 1, 2021, 8 pgs.
PsiQuantum Corp., Notice of Allowance, U.S. Appl. No. 16/544,718, dated Feb. 5, 2021, 6 pgs.
PsiQuantum Corp., International Search Report arid Written Opinion, PCT/US2019/030019, dated Jul. 17, 2019, 8 pgs.
PsiQuantum Corp., Notice of Allowance, U.S. Appl. No. 16/544,718, dated Mar. 24, 2021, 2 pgs.
PsiQuantum Corp., Notice of Allowance, U.S. Appl. No. 16/849,829, dated Apr. 5, 2021, 2 pgs.
Najafi, Non-Final Office Action, U.S. Appl. No. 16/664,716, dated Apr. 1, 2020, 14 pgs.

(56) References Cited

OTHER PUBLICATIONS

PsiQuantum, International Search Report / Written Opinion, PCT/US2019/051853, dated Jan. 27, 2020, 13 pgs.
PsiQuantum, International Preliminary Report on Patentability, PCT/US12018/033041, dated Nov. 26, 2019, 8 pgs.
PsiQuantum, International Preliminary Report on Patentability, PCT/US2018/054414, dated Apr. 8, 2020, 15 pgs.
PsiQuantum, International Search Report / Written Opinion, PCT/US2018/037892, dated Oct. 17, 2018, 18 pgs.
PsiQuantum, International Preliminary Report on Patentability, PCT/US2018/037892, dated Dec. 17, 2019, 12 pgs.
Najafi, Non-Final Office Action, U.S. Appl. No. 16/553,068, dated Apr. 1, 2020, 11 pgs.
Najafi, Non-Final Office Action, U.S. Appl. No. 16/544,718, dated Aug. 17, 2020, 6 pgs.
Najafi, Non-Final Office Action, U.S. Appl. No. 16/656,506, dated Aug. 13, 2020, 18 pgs.
Najafi, Notice of Allowance, U.S. Appl. No. 16/553,068, dated Sep. 18, 2020, 8 pgs.
Najafi, Notice of Allowance, U.S. Appl. No. 16/473,550, dated Sep. 24, 2020, 8 pgs.
Najafi, Notice of Allowance, U.S. Appl. No. 16/473,550, dated Nov. 3, 2020, 2 pgs.
Najafi, Notice of Allowance, U.S. Appl. No. 16/553,068, dated Nov. 12, 2020, 2 pgs.
Najafi, Notice of Allowance, U.S. Appl. No. 16/656,506, dated Nov. 3, 2020, 12 pgs.
Najafi, Final Office Action, U.S. Appl. No. 16/664,716, dated Oct. 16, 2020, 14 pgs.
Najafi, Notice of Allowance, U.S. Appl. No. 16/473,547, dated Dec. 9, 2020, 8 pgs.
Najafi, Notice of Allowance, U.S. Appl. No. 16/543,256, dated Dec. 9, 2020, 12 pgs.
PsiQuantum, Notice of Allowance, U.S. Appl. No. 16/840,166, dated May 24, 2021, 5 pgs.
Najafi, Non-Final Office Action, U.S. Appl. No. 17/135,861, dated Sep. 23, 2021, 6 pgs.
PsiQuantum, International Preliminary Reporton Patentability, PCT/US2019/016885, dated Aug. 11, 2020, 7 pgs.
PsiQuantum, International Search Report and Written Opinion, PCT/US2019/016885, dated Apr. 24, 2019, 9 pgs.
Thompson, Non-Final Office Action, U.S. Appl. No. 16/450,911, dated Aug. 2, 2019, 6 pgs.
Thompson, Notice of Allowance, U.S. Appl. No. 16/450,911, dated Dec. 11, 2019, 5 pgs.
Thompson, Non-Final Office Action, U.S. Appl. No. 16/985,137, dated Sep. 30, 2021, 6 pgs.
Najafi, Notice of Allowance, U.S. Appl. No. 16/046,807, dated Oct. 29, 2019, 7 pgs.
Najafi, Notice of Allowance, U.S. Appl. No. 16/136,124, dated Apr. 4, 2019, 8 pgs.
Najafi, Notice of Allowance, U.S. Appl. No. 16/136,124, dated Jun. 27, 2019, 8 pgs.
Najafi, Corrected Notice of Allowance, U.S. Appl. No. 16/136,124, dated Sep. 23, 2019, 2 pgs.
PsiQuantum Corp., International Search Report and Written Opinion, PCT/US2018/060802, dated Apr. 8, 2019, 6 pgs.
PsiQuantum, International Preliminary Report on Patentability, PCT/US2018/060802, dated May 19, 2020, 13 pgs.
Najafi, Notice of Allowance, U.S. Appl. No. 16/773,921, dated Sep. 22, 2021, 8 pgs.
Najafi, Notice of Allowance, U.S. Appl. No. 17/033,337, dated Dec. 9, 2021, 8 pgs.
McCaughan, A.N., et al., "Using Geometry to Sense Current," Nano Letters 16 (2016), 6 pgs.
Chung, Non-Final Office Action, U.S. Appl. No. 17/232,086, dated Dec. 16, 2021, 6 pgs.
Najafi, Notice of Allowance, U.S. Appl. No. 17/195,522, dated Dec. 9, 2021, 2 pgs.
Najafi, Notice of Allowance, U.S. Appl. No. 16/773,921, dated Dec. 24, 2021, 2 pgs.
Najafi, Notice of Allowance, U.S. Appl. No. 17/195,522, dated Jan. 7, 2022, 2 pgs.
Najafi, Notice of Allowance, U.S. Appl. No. 17/195,522, dated Nov. 12, 2021, 8 pgs.
Najafi, Notice of Allowance, U.S. Appl. No. 17/195,522, dated Nov. 16, 2021, 2 pgs.
Najafi, Notice of Allowance, U.S. Appl. No. 16/773,921, dated Nov. 15, 2021, 8 pgs.
Najafi, Notice of Allowance, U.S. Appl. No. 16/840,166, dated Jul. 21, 2021, 2 pgs.
Najafi, Notice of Allowance, U.S. Appl. No. 17/195,522, dated Feb. 9, 2022, 2 pgs.
Najafi, Notice of Allowance, U.S. Appl. No. 17/135,861, dated Feb. 15, 2022, 2 pgs.
Najafi, Notice of Allowance, U.S. Appl. No. 16/773,921, dated Feb. 16, 2022, 2 pgs.
Najafi, Notice of Allowance, U.S. Appl. No. 17/135,861, dated Jan. 28, 2022, 7 pgs.
Thompson, Non-Final Office Action, U.S. Appl. No. 16/985,137, dated Jan. 18, 2022, 8 pgs.
Najafi, Notice of Allowance, U.S. Appl. No. 17/033,337, dated Feb. 25, 2022, 7 pgs.
Najafi, Non-Final Office Action, U.S. Appl. No. 16/813,628, dated Mar. 7, 2022, 7 pgs.
Najafi, Notice of Allowance, U.S. Appl. No. 17/033,337, dated Mar. 16, 2022, 2 pgs.
Najafi, Notice of Allowance, U.S. Appl. No. 17/135,861, dated Mar. 15, 2022, 2 pgs.

* cited by examiner

US 11,313,719 B2

PHOTON NUMBER RESOLVING SUPERCONDUCTING DETECTOR

CROSS REFERENCE TO RELATED APPLICATIONS

This Application is a United States National Stage Application filed under 35 U.S.C. § 371 of PCT Patent Application Serial No. PCT/US2019/030019 filed on Apr. 30, 2019, which claims the benefit of and priority to U.S. Patent Application No. 62/665,491 filed on May 1, 2018, which is hereby incorporated by reference in its entirety.

TECHNICAL FIELD

This relates generally to photon detectors, including but not limited to, superconducting photon detectors.

BACKGROUND

Photon detectors are key components in many electronic devices. Ultra-sensitive photon detectors that are capable of detecting individual photons (e.g., single photons) can be used in a variety of applications, such as optical communications, medical diagnostics, space research, and optical quantum information applications such as optical quantum computing.

Because of many useful properties of superconductors, photon detectors based on superconductors are expected to have superior performance over conventional photon detectors.

SUMMARY

Some embodiments of the present invention provide a photon detector (e.g., capable of resolving a number of co-incident photons). The photon detector includes a superconducting wire having a plurality of alternating narrow and wide portions, a current source electrically-coupled to the superconducting wire and configured to supply the superconducting wire with electrical current, and an optical waveguide optically coupled to the plurality of narrow portions of the superconducting wire.

Some embodiments of the present disclosure provide a method of resolving a number of co-incident photons. The method includes optically coupling a waveguide to a superconducting wire having a plurality of alternating narrow and wide portions. The method further includes electrically coupling the superconducting wire to a current source. The method further includes providing a first current from the current source to the superconducting wire. The first current is configured to maintain the superconducting wire in a superconducting state in the absence of incident photons. The method further includes receiving one or more photons via the waveguide. The method further includes measuring an electrical property of the superconducting wire, wherein the electrical property is proportional to a number of photons incident on the superconducting wire. The method further includes determining the number of received photons based on the electrical property.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
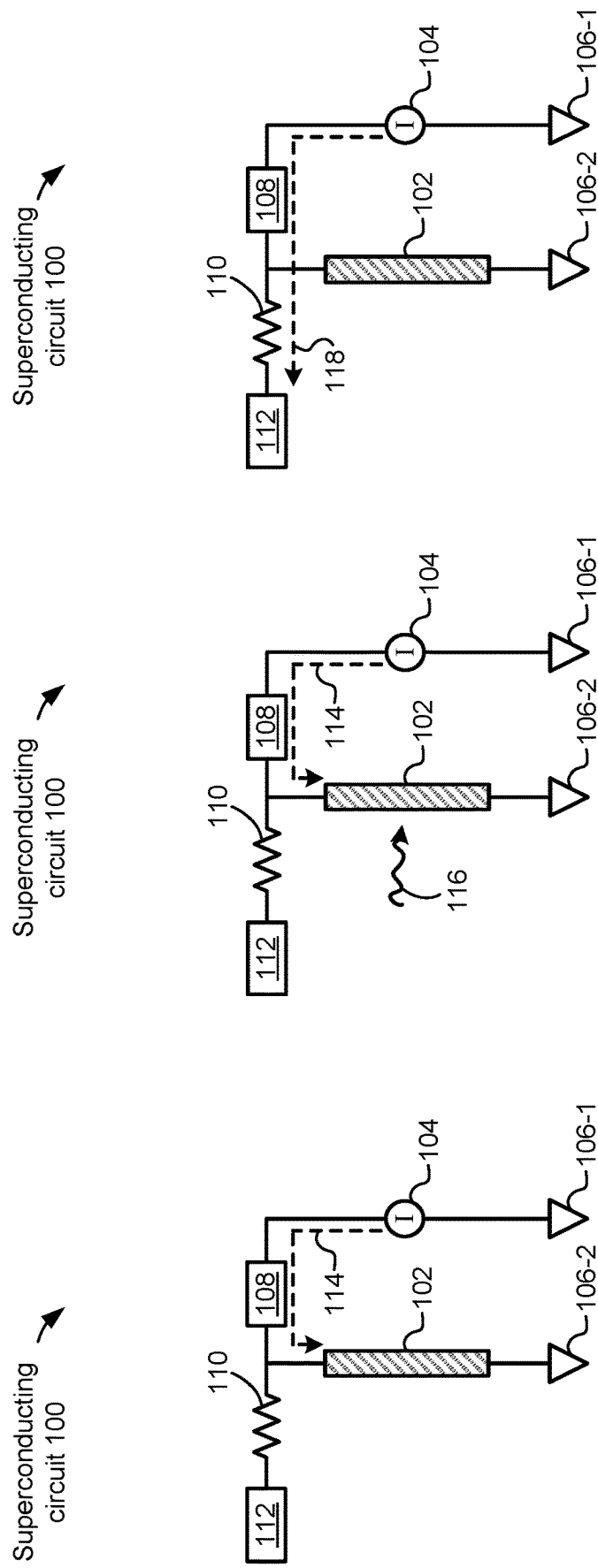
FIGS. 1A-1C show a superconducting photon detector circuit according to some embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

As used herein, a "superconducting circuit" or "superconductor circuit" is a circuit having one or more superconducting materials. For example, a superconducting photodetector circuit is a photodetector circuit that includes one or more superconducting materials. As used herein, a "superconducting" material is a material that is capable of operating in a superconducting state (under particular conditions). For example, a superconducting material is a material that operates as a superconductor (e.g., operates with zero or near zero electrical resistance) when cooled below a particular temperature (e.g., a critical temperature) and having less than a maximum current flowing through it. A superconducting material is also called herein a superconduction-capable material. The superconducting materials may also operate in an "off" state where little or no current is present. In some implementations, the superconducting materials operate in a non-superconducting state during which the materials have a non-zero electrical resistance (e.g., a resistance in the range of one thousand to ten thousand ohms). For example, in some cases, a superconducting material supplied with a current greater than a maximum superconducting current for the superconducting material transitions from a superconducting state with zero or near zero electrical resistance to a non-superconducting state with non-zero electrical resistance. As an example, superconducting wire 102, described below with respect to FIGS. 1A-1C, is a superconducting material that is capable of operating in a superconducting state (e.g., under particular operating conditions).

As used herein, a "wire" is a section of material configured for transferring electrical current. In some implementations, a wire includes a section of material conditionally capable of transferring electrical current (e.g., a wire made of a superconducting material that is capable of transferring electrical current while the wire is maintained at a temperature below a critical temperature). A cross-section of a wire (e.g., a cross-section that is perpendicular to a length of the wire) optionally has a geometric (e.g., flat or round) shape or a non-geometric shape. In some implementations, a length of a wire is greater than a width or a thickness of the wire (e.g., the length of a wire is at least 5, 6, 7, 8, 9, or 10 times greater than the width and the thickness of the wire). As used herein, a nanowire is a wire having a width less than one micron and/or a thickness less than one micron and need not be symmetric in cross section, e.g., can have a thickness that is several times larger than its width and vice versa. In some implementations, a nanowire has a width less than 100 nm and/or a thickness less than 100 nm.

FIG. 1A shows the superconducting photon detector circuit 100 having a current source 104, a superconducting wire 102, and activation circuitry 108. In some implementations, the circuit 100 is electrically-coupled to electrical grounds 106. FIG. 1A also shows a readout circuit 112 connected to the superconducting wire 102 (optionally via resistor(s) 110). In some implementations, the ground 106-1 is electrically-coupled (e.g., electrically connected) with the ground 106-2. In some implementations, the current source 104 is configured to supply an electrical current to superconducting wire 102 that is below a maximum superconducting current for the superconducting wire 102 (e.g., 70%, 80%, or 90% of the maximum superconducting current for the superconducting wire 102). In some implementations, the superconducting wire 102 is composed of a superconducting alloy such as a niobium alloy (e.g., niobium-germanium), molybdenum alloy, vanadium alloy or any other superconducting material. In some implementations, the size and shape of wire 102 is configured to maximize sensitivity to single photons (e.g., near-infrared single photons). For example, in some implementations, the wire 102 has a width less than 100 nm. In some implementations, the wire 102 has a thickness less than 50 nm, or even less than 10 nm. While the examples disclosed herein employ superconducting material for the detector wire, in some embodiments, any material can be used (including a non-superconducting material) as long as the material possesses a sufficient photon-induced change in electrical conductivity.

In some implementations, the resistor(s) 110 can have a resistance that is less than a resistance of the superconducting wire 102 while the superconducting wire 102 is in a non-superconducting state. In some implementations, the resistor(s) 110 include one or more distinct components. In some implementations, the resistor(s) 110 includes one or more resistances inherent in readout circuit 112 and/or the connection between readout circuit 112 and the superconducting wire 102.

In some implementations, the activation circuitry 108 is configured to control the flow of current to the superconducting wire 102. In some implementations, the activation circuitry 108 is configured to enable flow of current from the current source 104 to the superconducting wire 102 only during predetermined time periods. In some implementations, the activation circuitry 108 is configured to enable flow of current from the current source 104 to the superconducting wire 102 in response to an enable signal. In some implementations, the activation circuitry 108 is configured to enable flow of current from the current source 104 to the superconducting wire 102 in response to photon(s) incident on one or more components of the activation circuitry 108. In some implementations, the superconducting photodetector circuit 100 does not include the activation circuitry 108 and the current source 104 is coupled directly to the superconducting wire 102.

FIGS. 1A-1C show a series of diagrams to further illustrate how a superconducting wire, also referred to herein as a superconducting nanowire, can be employed as a photon detector in accordance with one or more embodiments. As shown in FIG. 1A, at a first time, a current source 104 can supply a current 114 that flows through superconducting wire 102. In some implementations and instances, all of the current 114, or substantially all of the current 114 (e.g., 95%, 98%, or 99%), flows through the superconducting wire 102 due to the wire 102 being in a superconducting state having zero (or near zero) electrical resistance (and thus, a resistance lower than the resistance of resistor(s) 110). In some implementations and instances, the superconducting wire 102 can be maintained at a temperature below a critical superconducting temperature (e.g., 5 Kelvin) and the current 114 can be set to be below a maximum superconducting current threshold for the superconducting wire 102. Under these conditions, the superconducting wire 102 can operate in a superconducting state (denoted by the hash marks on the wire 102 in FIG. 1A) with nearly all the current from the current source flowing through it (and no current flowing through the resistor(s) 110.

FIG. 1B shows the superconducting photon detector circuit 100 at a second time, right before one or more photon(s) 116 impinge upon the superconducting wire. At the second time, one or more photon(s) 116 can be incident on the superconducting wire 102. In some instances, when the photon(s) 116 are absorbed by the wire 102, the photon energy is transferred to the superconducting material and can raise the local temperature of that segment of superconducting wire above the critical superconducting temperature. Accordingly, in response to the absorption of the photon, the wire 102 can transition from the superconducting state to a non-superconducting state that has a resistance that is large compared to the resistor(s) 110.

FIG. 1C shows the superconducting photodetector circuit 100 at a third time, soon after absorption of the photon(s) 116. At the third time, the superconducting wire 102 has transitioned to the non-superconducting state (denoted by the crosshatching of the wire 102 in FIG. 1C) in response to the absorption of the photon(s) 116. The superconducting wire 102 now has a non-zero resistance (at least a portion of the wire is in a non-superconducting, e.g., normal state) and therefore current 118 will be forced through the resistor(s) 110 to the readout circuit 112. In some implementations and instances, all of the current from the current source 104, or substantially all of the current (e.g., 95%, 98%, or 99%), flows through the resistor(s) 110 when the wire is in the non-superconducting state. This flow of current is due to the resistor(s) 110 having a lower resistance than the wire 102 while the wire is in the non-superconducting state. In some implementations, the current 118 can be measured by the readout circuit 112.

The current 118 being supplied to the readout circuit 112 can provide an indication to a user that photon(s) 116 were detected by the superconducting photodetector circuit 100. However, because of the sensitivity of the superconducting wire 102 to the absorption of a single photon, absorption of a single photon can drive the wire to the non-superconducting state and absorption of any additional photons will not appreciably change the amount of current that flows through the resistor(s) 110. Thus, the device shown in FIGS. 1A-1C is not an ideal detector if resolving the number of incident photons is desired.

Figure 2:
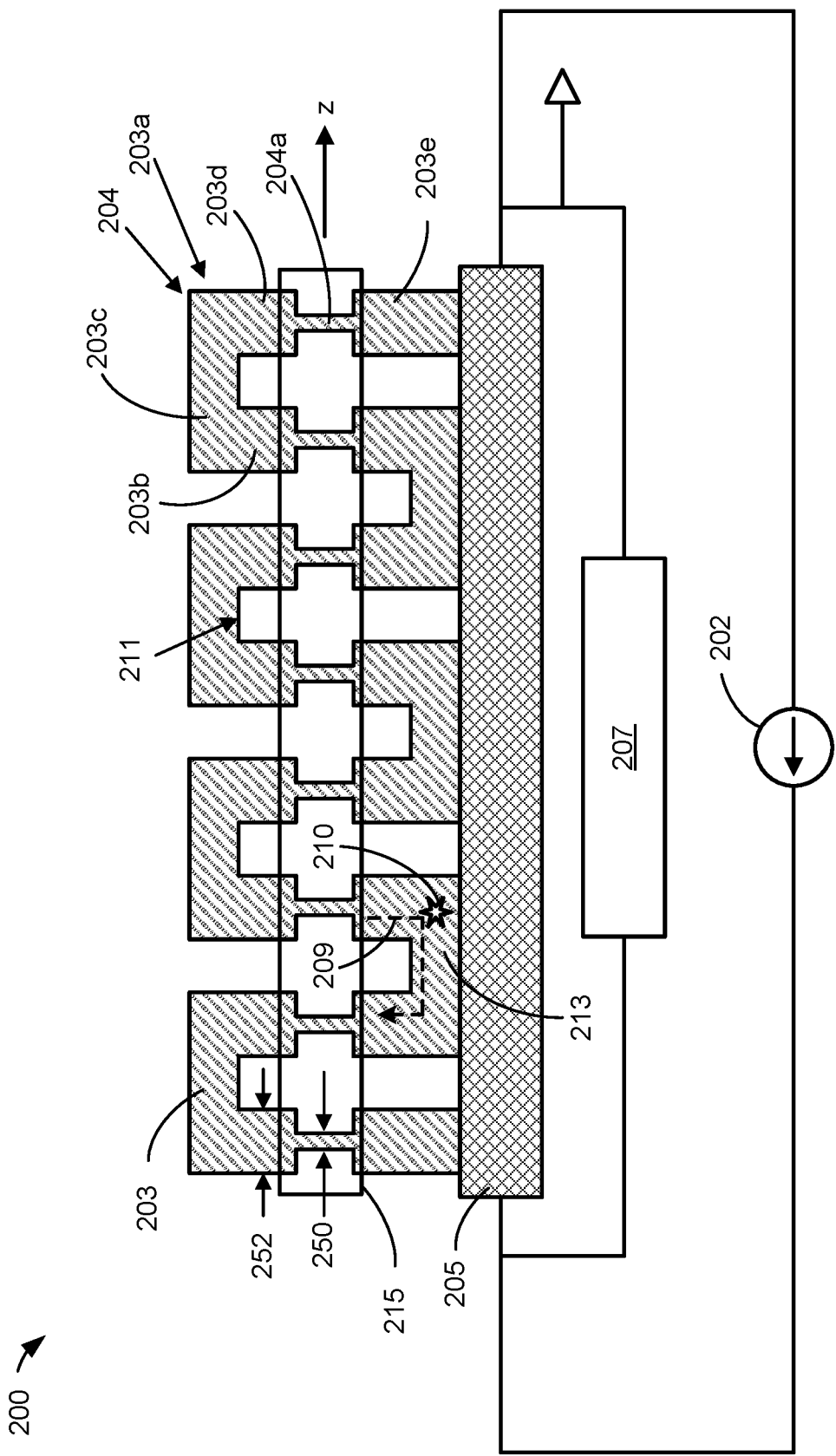
FIG. 2 shows a photon number resolving superconducting (PNRS) detector according to some embodiments.

FIG. 2 shows a photon number resolving superconducting (PNRS) detector 200 according to some embodiments. The PNRS detector 200 is similar in operation to that described above in reference to FIGS. 1A-1C except that in this case, a number of photosensitive superconducting segments are connected in an electrical series arrangement. More specifically, a current source 202 is electrically-coupled to a superconducting wire 203, e.g., via metal layer 205, and provides a current to the wire, with the current provided being below the critical current to maintain superconductivity in the superconducting wire 203 (e.g., the electrical current supplied by the current source 202 is selected so as to maintain the superconducting wire 203 in a superconducting (e.g., zero resistance) state in the absence of incident photons, which are incident from an optical waveguide, discussed below). The superconducting wire 203 includes a plurality of alternating narrow and wide portions (e.g., a plurality of narrow portions 250 and at least one wide portion 252, in alternating fashion). An optical waveguide, embodiments of which are discussed in greater detail below, is coupled to the plurality of narrow portions 250 of the superconducting wire 203. In use, photons within the waveguide impinge the narrow portions 250 of superconducting wire 203, resulting in photon detection.

In some embodiments, the narrow portions 250 have a first width (e.g., less than 100 nm) and the wide portions 252 have a second width that is greater than the first width (e.g., greater than 150 nm).

In this embodiment, to enable multi-photon detection and discrimination, an array of photon sensitive superconducting wire segments (e.g., the narrow portions 250 of superconducting wire 203) are connected in series and are connected to one another by larger bend portions (e.g., one or more of the wide portions 252 of superconducting wire 203 are bent, or are shaped so as to direct current flowing through such portions to undergo changes in current flow direction of 90 degrees or more), also formed from superconducting material. In some embodiments, the narrow portions 250 of the superconducting wire 203 are straight (e.g., to reduce current crowding effects within the narrow portion). This geometry results in a meandering superconducting wire with improved device yield characteristics because any bends are made in various wide portions 252 along the length of the wire and each narrow photon sensitive region (the thin segments) is a short and straight segment that can absorb a single photon yet not cause the entire superconducting wire to transition to the normal state. In addition, in contrast to parallel arrangements of nanowires, absorption of a single photon in one segment does not result in an avalanche effect by which current from the segment that has transitioned to the normal state is diverted to the remaining parallel segments, causing the critical current to be exceeded in these segments as well. The details of the operation of this arrangement are further described below in reference to FIGS. 3A-3C.

Additionally, in this embodiment, the superconducting wire 203 can be formed having a meandering geometry, such that the narrow segments are arrayed along a longitudinal direction (z-direction) of the detector. To provide for addressability of each segment during detection, a metal layer 205 can be disposed along one edge of the meandering wire, as shown. The metal layer 205 forms an electrical contact electrically coupled in parallel with the superconducting wire 203. For example, the metal layer 205 can at least partially overlap with the bottom (or top) portions of each U-shaped bend portion, as shown in FIG. 2. As described in more detail below in reference to FIGS. 3A-3C, the metal layer 205 can provide a parallel electrical resistance across the leg portions of each U-shaped segment, thereby providing a shunting path for current to flow if any of the narrow segments absorb a photon and transition to the non-superconducting state (or alternatively, if a narrow portion becomes damaged and/or permanently resistive for any reason). Thus, using the architecture shown in FIG. 2, the resistance of the parallel combination of the metal layer 205 and the meandering superconducting wire 203 varies based on how many narrow segments are in the non-superconducting state (i.e., how many single photons have been absorbed). This effective parallel resistance can then be measured using readout circuit 207, e.g., by measuring a corresponding voltage drop across the length of the metal layer 205 (e.g., the readout circuit is configured to measure the voltage across the electrical contact, which comprises metal layer 205 and is coupled in parallel with the superconducting wire 203).

In some embodiments, the PNRS detector 200 can be an integrated device with one or more components being disposed on, or in, one or more layers of material, e.g., the device can be formed as a planar integrated circuit. For example, the superconducting wire 203 can be formed from a superconductor layer (e.g., a thin film or the like) that itself can be patterned onto the surface of a substrate layer 201. As already noted above, the superconductor layer can be formed from any superconducting material that has been deposited onto the substrate layer 201 via any suitable process, e.g., by physical vapor deposition, chemical vapor deposition, atomic layer deposition, and the like. After deposition, the meander geometry can be subsequently patterned via any suitable patterning process, e.g., dry or wet etching, reactive ion etching, and the like. Likewise, the substrate layer 201 can include any suitable substrate material, e.g., a silicon substrate, a silicon-based substrate (such as a silicon nitride (SiN) substrate) and the like. In some embodiments, the substrate does not include an oxide layer, so as to reduce or prevent oxidation of the superconducting material layer.

Returning to the example shown in FIG. 2, the meandering shape can be formed from an array of bent (e.g., U-shaped) superconducting structures having alternating orientations and that are each distributed along the longitudinal direction (z-direction) of the PNRS detector 200. Each U-shaped portion of the PNRS detector 200 includes two leg portions that are connected to a base portion. For example, in the embodiment shown in FIG. 2, leg portions 203a and 203b abut a base portion 203c to form an inverted U-shape portion 204 (and any number of similar U-shaped portions can be distributed along the z-direction to provide for increased dynamic range, or reliability, of the detector). Furthermore, each leg portion can include a relatively narrow, photon-sensitive central wire segment, each end of which abuts a wider end segment. For example, the leg portion 203a of inverted U-shaped portion 204 includes central narrow wire segment 204a, whose upper end abuts wider leg portion 203d and whose lower end abuts wider leg portion 203e.

In the illustrative example shown in FIG. 2, the relatively narrow and straight photosensitive wire segments serve as a series array of single photon detectors that each operate in a manner that is similar to wire 102, described above in reference to FIGS. 1A-1C. The narrow segments are electrically-coupled to each other via the larger bend segments of the superconducting wire, and these lager bend segments can serve as photon-insensitive buffer regions of the superconducting wire. While the transition in thickness between each narrow central segment and wide arm of each bend segment is shown to be abrupt in FIG. 2, any gradual, tapered transition can be used without departing from the scope of the present disclosure. For example, in some embodiments, the superconducting wire is tapered between the narrow portions and the wide portions to reduce current crowding effects. In some embodiments, curved transitions can be employed for the upper/lower bends of the larger U-shape bend regions (e.g., bend region 211), thereby minimizing current crowding phenomena that can be present in superconducting wires having sharp bends.

In addition, the relative sizes of the narrow central segments and the larger buffer regions are chosen such that, at the design wavelength, a single photon can provide enough energy to cause the narrow segment to transition to a non-superconducting state, thereby raising the series resistance of that segment of the superconducting wire. In contrast, any photon that impinges one of the larger buffer regions may not cause that entire region to transition to the non-superconducting state, but rather will create merely a local hotspot. For example, the transverse width (i.e., transverse to the current flow direction) of the thin segments can be approximately, 100 nm or greater and the transverse width of the larger buffer regions can be approximately 150 nm or less. Due to the relatively large area in the buffer region, e.g., buffer region 213, there is sufficient space for the superconducting current 209 to be redistributed around any local hotspots 210 caused by an errant photon absorption. Thus, even if a photon is absorbed by the buffer regions, the superconducting current can still proceed generally unimpeded down the remaining portion of the device. Furthermore, any local heating present in the central narrow segment can be generally contained within that segment (or can intrude only minimally into the larger width buffer regions), leaving the other, downstream portions of the wire in the superconducting state.

In view of the above, the PNRS detector geometry shown in FIG. 2 can provide for a spatially selective detector that will preferentially detect photons that impinge along the length of the device only (along the z-direction) and will be generally insensitive to photons that are incident on the superconducting wire, if incident in a region that is outside of a relatively narrow region defined by the length of the photo-sensitive narrow segments. In other words, the active region 215 for photon detection for a device having this geometry can be an elongated rectangle, as shown. As described in more detail below, such an arrangement can be advantageous for photon number resolving detection in an integrated optical device such as a linear waveguide. Such detectors can be useful in a number of optical systems, including, e.g., as detectors within heralded photon sources (e.g., as described with reference to FIG. 7) used in a linear optical quantum computer.

Figure 3C:
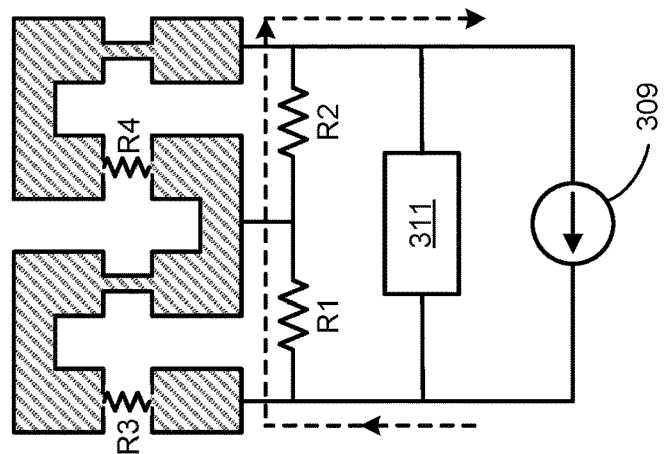
FIGS. 3A-3C illustrate the operation of a portion of the PNRS detector under the case of two incident photons according to some embodiments.
Figure 3B:
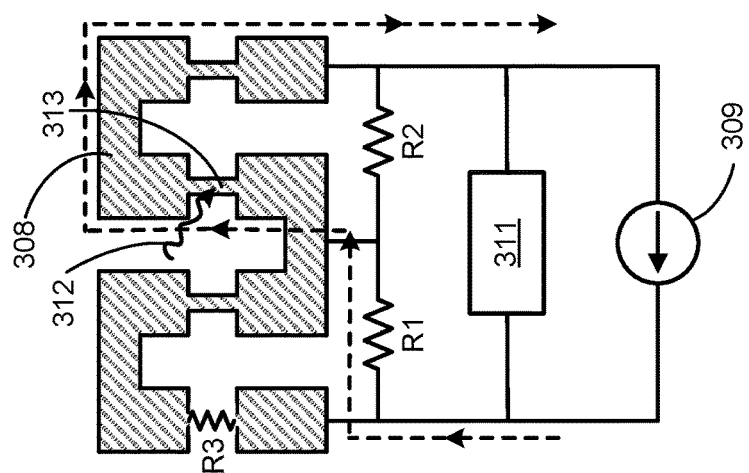
Figure 3A:
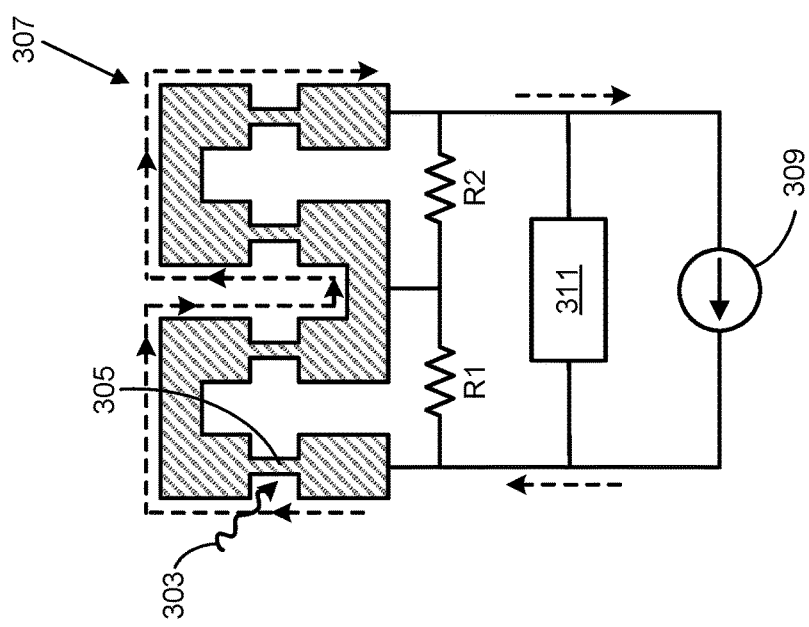

FIGS. 3A-3C illustrate the operation of a portion of the PNRS detector 200 under the case of two incident photons. FIG. 3A shows the state of the detector just before a first photon 303 is absorbed by a first narrow segment 305. Before the photon 303 is absorbed, the entire length of the superconducting wire 307 is in the superconducting state, and therefore the entire (or majority of) current I that is output from the current source 309 passes through the superconducting wire 307 and completely bypasses the resistors R1 and R2. In FIG. 3A, the resistors are shown schematically but in the actual device, these resistors would be formed by a continuous metal layer, e.g., metal layer 205 shown in FIG. 2. As shown, the PRNS detector includes a readout circuit 311 electrically coupled to the superconducting wire 307. The readout circuit 311 is configured to measure an electrical property of the superconducting wire (e.g., a voltage across the superconducting wire 307 or an impedance of the superconducting wire 307). For example, in the state shown in FIG. 3A the output voltage measured by the readout circuit 311 is low, e.g., close to 0 V.

Figure 4A:
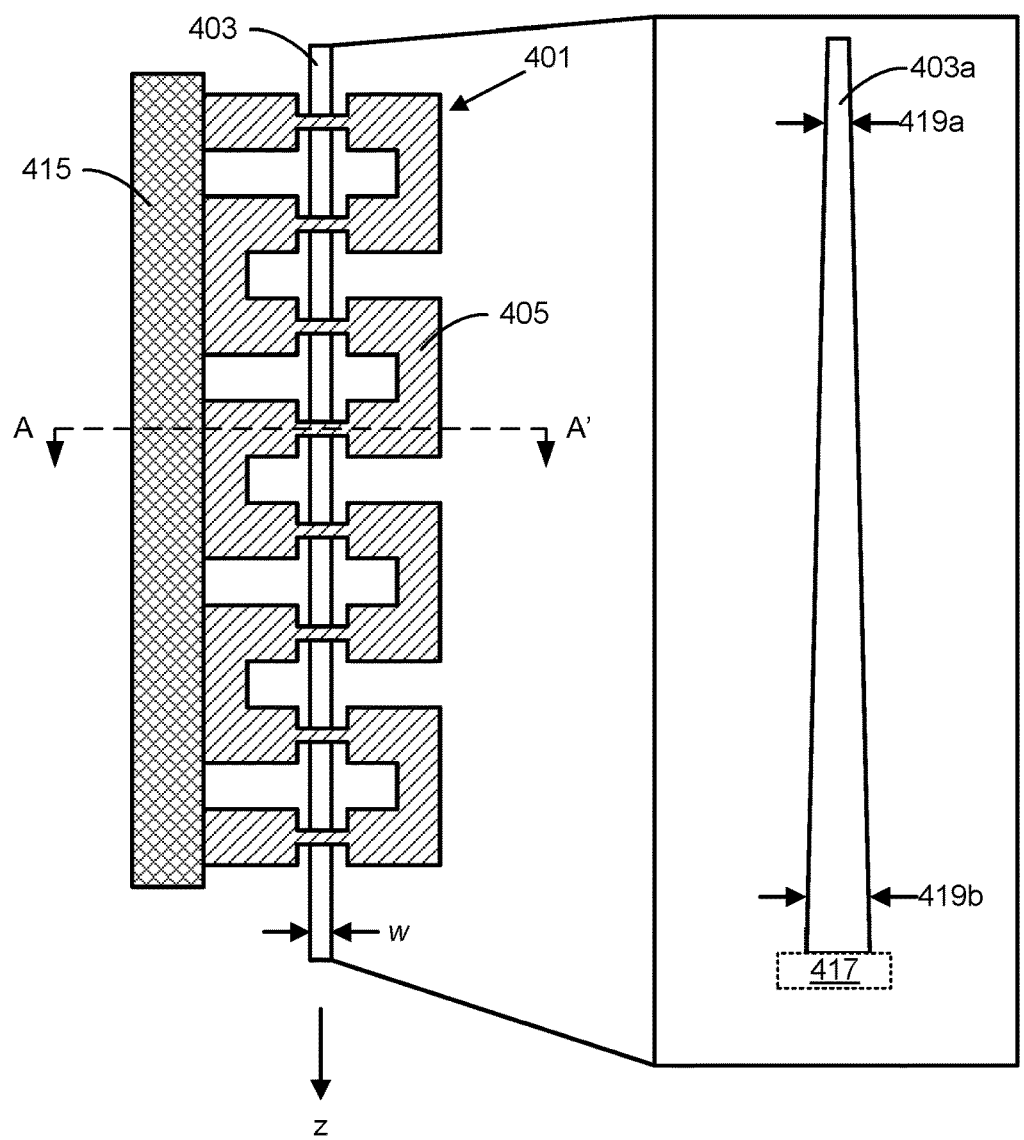
FIGS. 4A-4B show a PNRS detector integrated with an optical waveguide according to some embodiments.
Figure 4B:
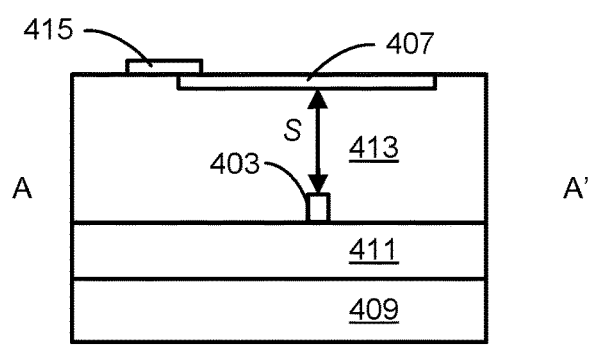

The narrow portions of the superconducting wire 307 are configured to transition from a superconducting (zero resistance) state to a non-superconducting (non-zero resistance) state in response to an incident photon from an optical waveguide (e.g., optical waveguide 403, FIGS. 4A-4B). After the photon 303 is absorbed by the first narrow segment 305, the narrow segment 305 transitions to a resistive normal state (also referred to as a non-superconducting state), and therefore can be represented as a resistor R3, as shown in FIG. 3B. When this occurs (e.g., while narrow portion 305 of the superconducting wire is in a non-superconducting state), the electrical contact has a resistance R1 that is less than a resistance R3 of the superconducting wire 307. Because R3 is much greater than R1, the current I is now forced through R1 and then back into the remaining U-shaped meandering portion 308 of the superconducting wire 307, which is still in a superconducting state. At this point, the voltage drop measured by the readout circuit 311 in this state is I*R1. Shortly after the photon 303 is absorbed, or even simultaneously with the absorption of photon 303, a second photon 312 can be absorbed by a second narrow segment 313. As before, this second narrow segment 313 will transition to the non-superconducting state forming resistor R4, as shown schematically in FIG. 3C. Now, current is forced to pass through both resistors R1 and R2 and thus, the voltage drop measured by the readout circuit 311 in this state is I*(R1+R2).

In view of the above, the PNRS detector can discriminate between a single photon absorption or multiple photon absorptions because the voltage drop at the readout circuit 311 depends on whether one of the narrow segments of a particular U-shape meander has absorbed a photon, transitioned to the normal state, and forced its respective current through its associated shunt resistor. More generally, in a PNRS having m U-shaped meander portions, and resistors $R1=R2=R_m=R$, if n photons are absorbed by n different photon sensitive segments of the U-shaped meanders, the current is re-routed into n resistors, resulting in an output voltage of ~I*n*R, which is proportional to the number of absorbed photons. In some embodiments, the number of U-shaped meanders m can be made large compared to the number of photons that are expected to be detected to minimize the chance that any given multi-photon detection will exceed the dynamic range of the detector. In this manner, the electrical property of the superconductor 307 measured by the readout circuit 311 (e.g., voltage across the superconductor 307) is indicative of a number of photons incident to the superconducting wire 307.

Note that, in some embodiments, the wide portions are sized so as to remain in the superconducting state regardless of a state of the narrow portions. For example, meandering portion 308 remains in a superconducting state regardless of the state of narrow portion 313.

FIG. 4A shows a PNRS detector 401, similar to those already described above, but here integrated with an optical waveguide 403. In this example, the PNRS detector 401 can be used to detect photons that are travelling in the optical waveguide 403. In this example, the linear optical waveguide 403 is disposed within a central region of the superconducting wire 405, directly underneath (or above) the array of photo-sensitive wire segments. In some embodiments, the input of the waveguide can be coupled to a photon source (not shown). Photons generated by the photon source are coupled into the waveguide and eventually arrive at the detector region shown in FIG. 4A. In some embodiments, the waveguide 403 and the meandering superconducting wire 405 are positioned close enough to each other that it is possible for a photon that is propagating in one of the guided modes of the waveguide to couple out of the waveguide and get absorbed by one of the narrow segments after which it is detected by a readout circuit (not shown), as described above. As shown in the cross section along A-A shown in FIG. 4B (not to scale), in some embodiments, the optical waveguide 403 is vertically stacked with the superconducting layer 407 (e.g., with respect to substrate 409). Superconducting layer 407 corresponds to superconducting wire 405 in FIG. 4B (e.g., superconducting wire 405 is formed from superconducting layer 407). The separation s between the waveguide 403 and any given narrow segment of superconducting layer 407 is approximately 100 nm or less. This allows for a weak, but non-zero electromagnetic coupling between the guided photons and the photo-sensitive segments of superconducting wire. For example, in some cases the coupling could be on the order of 10% or less per photo-sensitive segment (i.e., the probability of a photon absorption by any given segment is 10%). In such an arrangement, a superconducting wire having 10, 20, 30, 40, 50, or even more photo-sensitive segments may be employed to increase the overall single/multi photon detection efficiency. In addition, because the probability of detecting more than one photon at the same photo-sensitive segment is relatively small, a device such as this can also serve as a PNRS as described above (the photon number is proportional to the number of individual narrow segments that absorb a photon).

The waveguide integrated device shown in FIG. 4A can also be fabricated as a planar integrated circuit, as shown in the cross-section of FIG. 4B. In one embodiment, the base substrate 409 can be a flat silicon wafer. This silicon substrate can be covered by a high-quality silicon oxide layer 411. A waveguide 403 can be formed from silicon and disposed on the surface of the high-quality silicon oxide layer 411, and covered by one or more capping layers, e.g., by a lower-quality silicon oxide layer 413. The superconducting layer 407 that forms the superconducting nanowire is disposed on top of the lower-quality silicon oxide layer 413. A metal layer 415 (e.g., an electrical contact) is disposed on the upper layer of the device, partially overlapping with both the lower-quality silicon oxide layer 413 and the superconducting layer 407.

While the waveguide 403 shown in FIG. 4A has a constant width w, other geometries are possible without departing from the scope of the present disclosure. For example, to compensate for lower detection efficiencies of downstream narrow segments and thus to improve coupling, the optical waveguide is tapered in some embodiments, such that a downstream portion of the optical waveguide is wider than an upstream portion of the optical waveguide. That is, as described in more detail below in reference to FIG. 6, the waveguide width can increase with increasing length to improve the coupling efficiency of downstream photo-sensitive segments relative to upstream photo-sensitive segments. Tapered waveguide 403a shows one such example (e.g., tapered waveguide 403a has width w that changes along the length of the tapered waveguide 403a, e.g., tapered waveguide 403a has a narrow end 419a and a wide end 419b, which is wider than the narrow end 419a). In the PNRS shown in FIG. 4A, 8 photon-sensitive photo-sensitive segments are used as individual photon detection regions but any number of photo-sensitive segments can be used having any desired coupling efficiency to the waveguide without departing from the scope of the present disclosure. In some embodiments, PNRS detector 401 includes a mirror 417 disposed at an end of waveguide 403 (e.g., either a straight waveguide 403 or tapered waveguide 403a, although mirror 417 is shown disposed at an end of tapered waveguide 403a). In some embodiments, mirror 417 is a Bragg mirror. In some embodiments, mirror 417 is a retroreflective mirror. In some embodiments, mirror 417 is a loop mirror. When PNRS detector 401 includes mirror 417, PRNS detector is a "multi-pass" mirror, meaning photons may travel along waveguide 403 more than once (e.g., travel through the waveguide in one direction, reflect off of mirror 417, and then travel in the opposite direction).

Figure 5A:
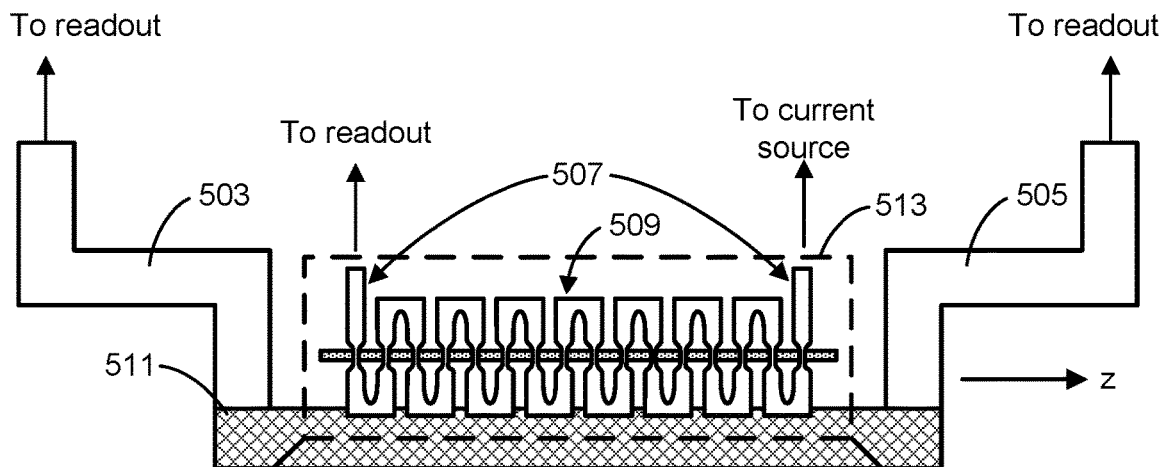
FIGS. 5A-5C show an illustrative layout for a waveguide integrated PNRS detector according to some embodiments.
Figure 5B:
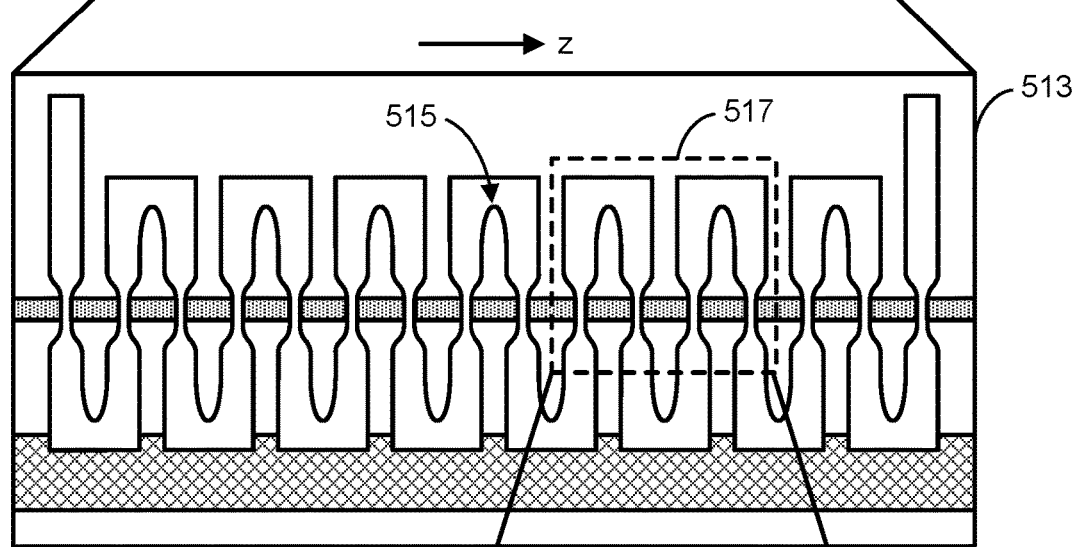
Figure 5C:
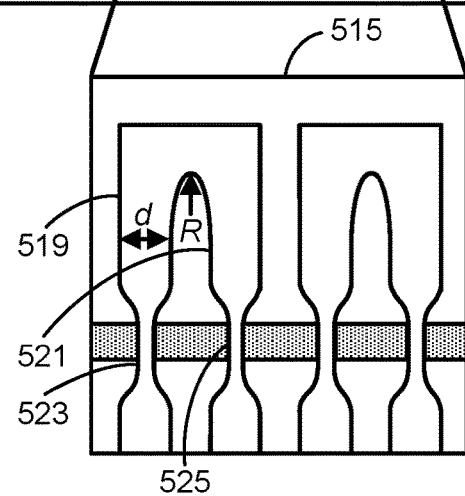

FIGS. 5A-5C show an illustrative layout for a waveguide integrated PNRS detector 500 according to some embodiments. FIG. 5A shows a zoomed-out view that shows a configuration of leads 503 and 505 that provide the electrical connections to one or more readout circuits (not shown), e.g., a high impedance>1 kOhm CMOS readout circuit or the like. Other lower impedance readouts are also possible without departing from the scope of the present disclosure. FIG. 5A also shows leads 507 that are connected to meandering superconducting wire 509 that provide for connections to a current source (not shown). In some embodiments the readout circuit and the current source circuitry can be located on- or off-chip. FIG. 5A also shows a possible positioning for metal layer 511 that provides for the resistive bypass as described above in reference to FIGS. 2-3. Advantageously the layout of the metal layer 511 is generally insensitive to the precise relative positioning (in the z-direction) between the metal layer 511 and the meandering superconducting wire 509.

FIG. 5B shows a zoomed in view of region 513 showing additional details related to the shape of the meandering superconducting wire 509. As described in FIG. 2, the superconducting wire includes several U-shaped portions that are connected in series, via photo-sensitive segments, with each U-shaped portion of the PNRS detector 200 including two vertical leg portions that are connected to a horizontal base portion. FIG. 5B also shows that the bends of the base portions can have circular or smoothly (e.g., continuously but not necessarily circular) curved edges 515 to reduce current crowding on the inner edges of the bends.

FIG. 5C shows a further zoomed in view showing additional detail related to region 517 shown in FIG. 5B. In particular, FIG. 5C shows that for each bend in the U-shaped portion of the superconducting wire, the inside radius of curvature R is approximately equal to the width d of the leg portions 519 and 521 (e.g., each wide portion includes a bend, and an inside bend radius of each wide portion is equal to a width of the wide portion). In addition, FIG. 5C shows that the transition between the leg portions 519 and 521 and the photo-sensitive central segments 523 and 525 can be a gradual tapered transition between the two thicknesses of superconducting wire.

Figure 6:
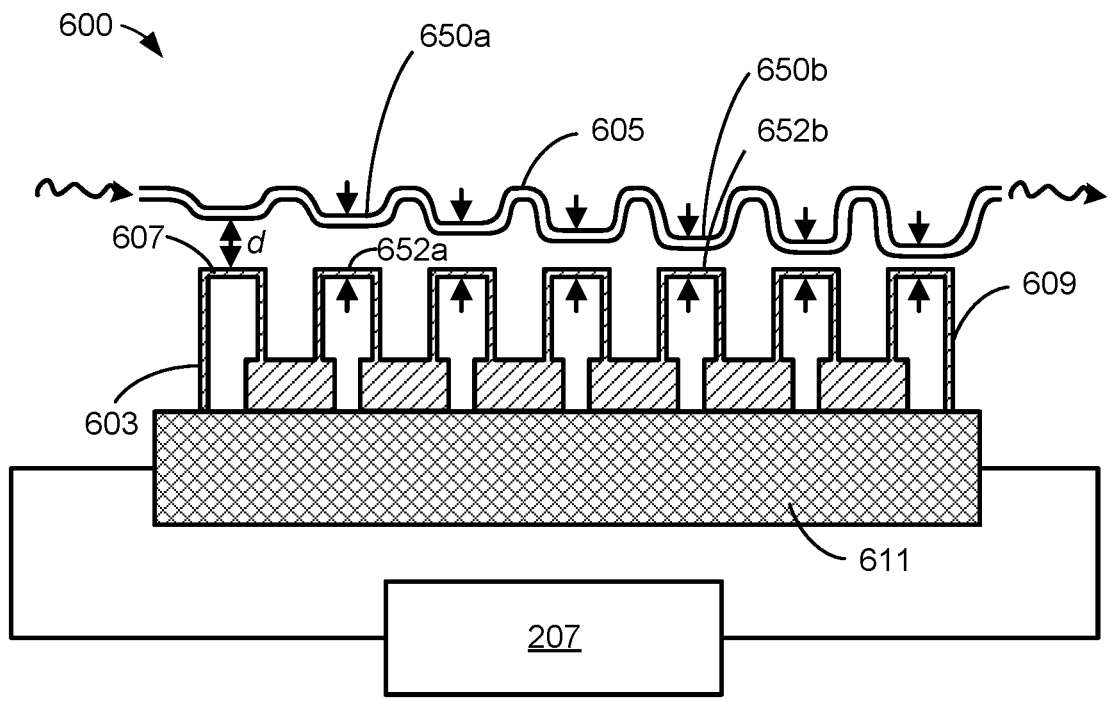
FIG. 6 shows a waveguide integrated PRNS detector in accordance with one or more embodiments.

FIG. 6 shows a waveguide integrated PRNS detector 600 in accordance with one or more embodiments. In this example, a superconducting wire 603 is formed having multiple U-shaped bends as before, with a resistive metal layer 611 disposed on one edge, except that in this example, a bent waveguide 605 is positioned adjacent to the superconducting wire 603 (e.g., on the same layer of the chip but spaced horizontally apart from the superconducting wire). In this example, each U-shaped portion of the superconducting wire 603 includes an upper photo-sensitive segment, e.g., segment 607, that, like in the devices described above, can transition to a non-superconducting state upon absorption of a photon that is coupled out of the adjacent waveguide 605. Such a bent-waveguide arrangement can be advantageous because the separation d between the waveguide and the photo-sensitive segment can be chosen precisely and independently for each segment, something that is difficult to achieve if the waveguide and superconducting wire are manufactured on different layers of the chip.

In some embodiments, the optical waveguide 605 is positioned so that a first coupling portion 652a is separated from a first narrow portion 650a (e.g., segment) of the superconducting wire 603 by a first distance such that the first coupling portion is evanescently coupled to the first narrow portion. A second coupling portion 652b, downstream from the first coupling portion, is separated from a second narrow portion 650b of the superconducting wire 603 by a second distance, less than the first distance, such that a coupling efficiency between the second coupling portion and the second narrow portion is greater than a coupling efficiency between the first coupling portion and the first narrow portion. More specifically, the distance d between the waveguide and the photo-sensitive segment can be decreased as a function of the longitudinal position along the waveguide (along the direction of photon propagation 613). In general, the geometric coupling efficiency between a waveguide and a superconducting wire segment increases with decreasing separation d. Thus, in the device shown in FIG. 6, the geometric coupling efficiency of the first segment 607 is smaller than the geometric coupling efficiency of the last segment 609. Such a design can be helpful to ensure a tighter distribution of overall detector efficiencies in the presence of manufacturing defects relative to a design that employs a flat waveguide with constant separation between the superconducting segments along the length of the waveguide. The fact that such a design change can result in a tighter distribution of detector efficiencies for manufactured devices can be understood by noting that in the straight waveguide (constant d) case, the probability that the first segment will absorb a photon is higher than the probability that the last segment will absorb a photon (the more segments that are present in the photon's path before the last segment, the higher the probability that the photon will be absorbed before it even reaches the last segment). Because of this effect, a defect or failure in the first segment can have a much more dramatic effect on overall detector efficiency than a defect or failure in the last segment, with this effect being accentuated for long detectors that include many photo-sensitive segments. In the embodiment shown in FIG. 6 the effect of decreasing photon absorption probability in the later occurring segments is countered by decreasing the spacing between the waveguide and superconducting segments, thereby increasing the coupling efficiency for these later occurring segments relative to the earlier occurring segments.

In some embodiments the device described above can be employed in an application that calls for single photon detection or multi-photon detection. In either case, the device has the added advantage of a detector architecture that has a high efficiency (the more numerous the narrow photo-sensitive segments, the higher the single photon detection probability and the higher the dynamic range of the multi-photon detector). In addition, embodiments disclosed herein will result in increased yield relative to architectures that employ tight bends due to the fact that in the embodiments disclosed herein, the narrow photosensitive segments are straight and relatively short compared to the overall larger meander structures. Thus, because embodiments disclosed herein include fewer sharp bends in the narrow segments the devices will be subject to fewer nanofabrication defects thereby increasing device yield. Additionally, embodiments disclosed herein provide for increased operational reliability because even in the event of a complete failure (open circuit) of one of the narrow segments, the parallel resistor formed from the metal layer will re-route the measurement current around the failure and the device will continue to function, albeit at slightly reduced efficiency (this is to be compared to a pure series arrangement, without the metal resistor layer, where failure of one segment results in a total failure of the detector).

Figure 7:
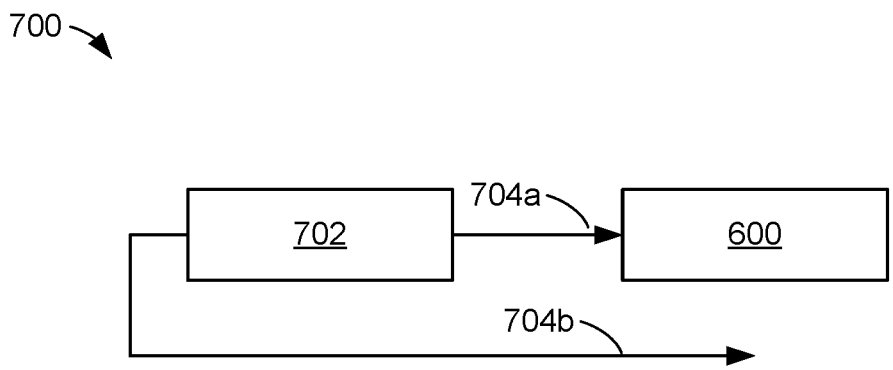
FIG. 7 shows a probabilistic photon source coupled to a waveguide integrated PRNS detector, in according to some embodiments.

FIG. 7 shows an optical device 700 that includes a photon source 702 coupled to a waveguide integrated PRNS detector 600, according to some embodiments. In some embodiments, photon source 702 is a probabilistic photon source. For example, photon source 702 has a photon-number distribution (e.g., a distribution of numbers of photons produced per attempt) with a non-zero variance. In some embodiments, photon source 702 is most likely to, on a respective attempt, produce zero photons (e.g., there is a 90% probability of producing zero photons per attempt to produce a single-photon). The second most likely result for an attempt is production of a single-photon (e.g., there is a 9% probability of producing a single-photon per attempt to produce a single-photon). The third most likely result for an attempt is production of two photons (e.g., there is a 1% probability of producing two photons per attempt to produce a single-photon). In some circumstances, there is less than 1% probability of producing more than two photons.

In some embodiments, optical device 700 is configured to produce heralded single-photons. Heralded single-photons can be produced in a variety of ways. For example, in some embodiments, the photon sources 702 include a laser or any other light source, e.g., LEDs, and the like. In embodiments in which photon source 702 is a laser, the laser produces a laser beam, referred to as a pump or a pump beam (which includes pump photons). In some embodiments, the laser produces many photons either continuously or in bursts (e.g., pulses). A photon pair is created by converting one pump photon into a pair of photons having lower energy than the pump photon (e.g., using a material having a second-order non-linear coefficient, which is optionally included in photon source 702). One of the photons is passed to PRNS detector 600 via waveguide 704a (e.g., optically coupled to waveguide 605 of PRNS detector 600), which is then used to herald the presence of the other one of the photons (e.g., in waveguide 704b).

Alternatively, in some embodiments, two photons from a pump are converted into a pair of photons. One photon of the pair of photons has a lower energy than a respective pump photon. The other photon of the pair of photons has higher energy than the respective pump photon. One of the photons (e.g., either the higher-energy photon or the lower-energy photon) is then used to herald the presence of the other photon.

Figure 8:
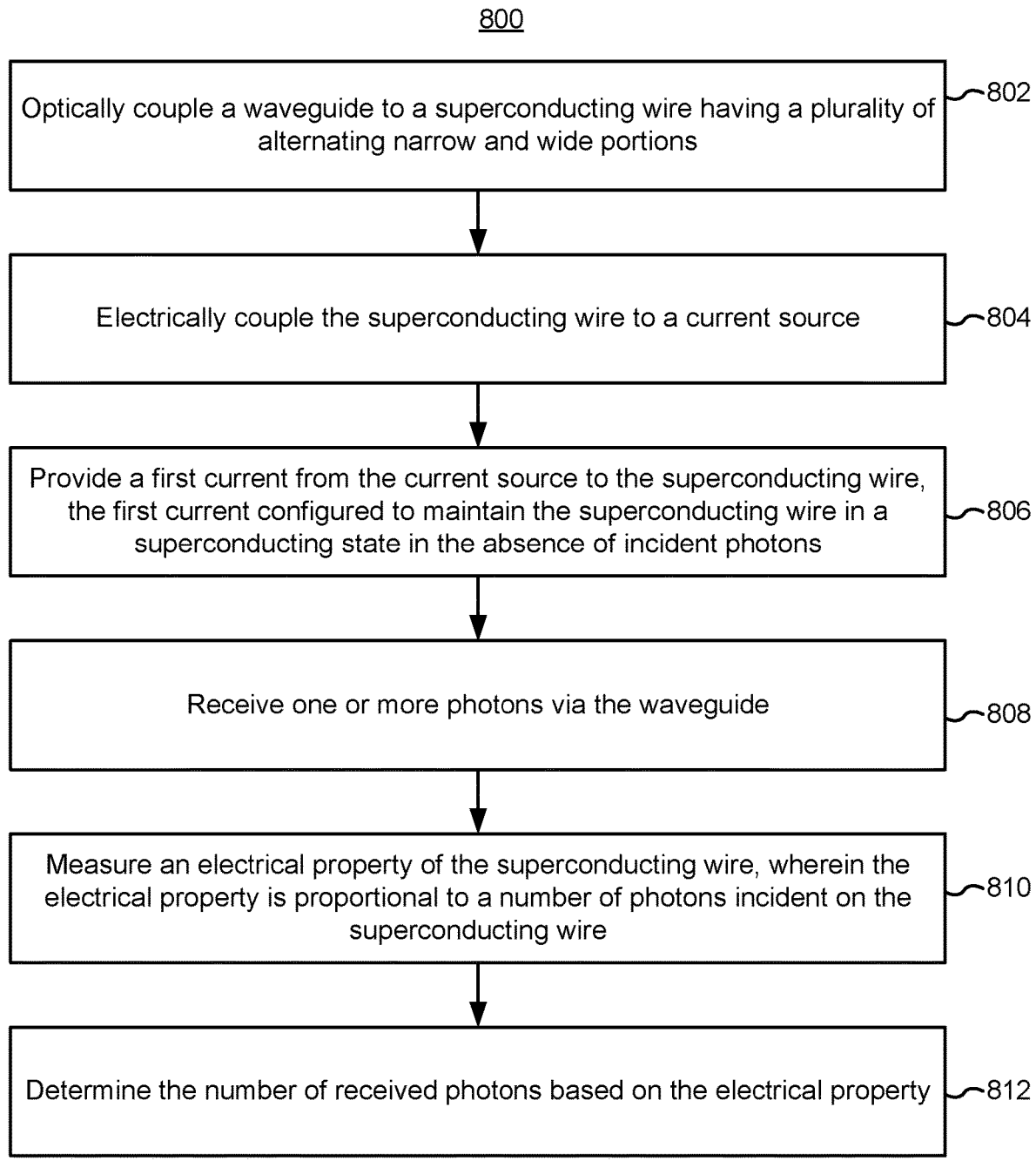
FIG. 8 is a flow chart illustrating a method of resolving a number of co-incident photons, in accordance with some embodiments.

FIG. 8 is a flow chart illustrating a method of resolving a number of co-incident photons, in accordance with some embodiments. In some embodiments, the method 800 is performed by any of the photon detectors described herein (e.g., a photon number resolving superconducting (PNRS) detector 200, FIG. 2, PNRS detector 401, FIG. 4, integrated PNRS detector 500, FIG. 5, and/or PRNS detector 600, FIG. 6).

The method 800 includes optically coupling (802) a waveguide (e.g., an optical waveguide) to a superconducting wire having a plurality of alternating narrow and wide portions. In some embodiments, optically coupling the waveguide to a superconducting wire includes positioning the waveguide so that a first coupling portion of the waveguide is separated from a first narrow portion of the superconducting wire by a first distance such that the first coupling portion is evanescently coupled to the first narrow portion. In some embodiments, the waveguide includes a plurality of coupling portions, and optically coupling the waveguide to a superconducting wire includes positioning a second coupling portion, downstream from the first coupling portion, such that the second coupling portion (comprising one of the plurality of coupling portions of the waveguide) is separated from a second narrow portion of the superconducting wire by a second distance, less than the first distance, such that a coupling efficiency between the second coupling portion and the second narrow portion is greater than a coupling efficiency between the first coupling portion and the first narrow portion.

The method 800 further includes electrically coupling (804) the superconducting wire to a current source. The method 800 further includes providing (806) a first current from the current source to the superconducting wire. The first current is configured to maintain the superconducting wire in a superconducting state in the absence of incident photons (e.g., the first current is has a current density within the narrow portions that is less than, but close to, a threshold current density for superconductivity of the narrow portions).

The method 800 further includes receiving (808) one or more photons via the waveguide. In some embodiments, as explained below, the one or more photons are received from a probabilistic photon source.

The method 800 further includes measuring (810) an electrical property of the superconducting wire, wherein the electrical property is a function of (e.g., proportional to, or alternatively a non-linear function of) the number of photons incident on the superconducting wire. In some embodiments, the electrical property is a voltage across the superconducting wire or an impedance of the superconducting wire. In some embodiments, the electrical property is indicative of a number of photons incident to the superconducting wire.

The method 800 further includes determining (812) the number of received photons based on the electrical property (e.g., by determining a correspondence between the measured electrical property and the number of received photons).

In some embodiments, the method 800 includes coupling a photon source (e.g., a probabilistic photon source) to the optical waveguide. In some embodiments, the method 800 includes attempting to generate a photon using the photon source (e.g., gating the photon source). In some embodiments, the method 800 includes converting a photon produced by the photon source into a pair of photons. In some embodiments, the method 800 further includes detecting a respective photon of the pair of photons to herald the presence of the other photon of the pair of photons. In some embodiments, the method 800 includes outputting a binary value in accordance with a determination that a photon was detecting, the binary value indicating (e.g., heralding) the presence of the other photon.

Although some of various drawings illustrate a number of device stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first protective layer could be termed a second protective layer, and, similarly, a second protective layer could be termed a first protective layer, without departing from the scope of the various described implementations. The first protective layer and the second protective layer are both protective layers, but they are not the same protective layer unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A photon detector, comprising:
   a superconducting wire having a plurality of alternating narrow and wide portions;
   a current source electrically-coupled to the superconducting wire and configured to supply the superconducting wire with electrical current;

an optical waveguide optically coupled to the plurality of narrow portions of the superconducting wire; and
an electrical contact electrically-coupled in parallel with the superconducting wire,
wherein the electrical contact has a resistance that is less than a resistance of the superconducting wire while at least one narrow portion of the superconducting wire is in a non-superconducting state.

2. The photon detector of claim 1, wherein each narrow portion of the plurality of narrow portions is straight to reduce current crowding effects within the narrow portion.

3. The photon detector of claim 1, wherein at least one wide portion of the plurality of wide portions is bent.

4. The photon detector of claim 1, wherein the narrow portions each have a first width and the wide portions each have a second width, the second width being greater than the first width.

5. The photon detector of claim 1, further comprising a readout circuit electrically-coupled to the superconducting wire and configured to measure an electrical property of the superconducting wire, wherein the electrical property is indicative of a number of photons incident to the superconducting wire.

6. The photon detector of claim 5, wherein the electrical property comprises a voltage across the superconducting wire or an impedance of the superconducting wire.

7. The photon detector of claim 6, wherein the readout circuit is configured to measure the voltage across the electrical contact electrically-coupled in parallel with the superconducting wire.

8. The photon detector of claim 1, wherein the optical waveguide is tapered to improve coupling, such that a downstream portion of the optical waveguide is wider than an upstream portion of the optical waveguide.

9. The photon detector of claim 1, wherein the optical waveguide is vertically stacked with the superconducting wire.

10. The photon detector of claim 1, further comprising a photon source coupled to the optical waveguide and configured to probabilistically generate photons.

11. The photon detector of claim 1, wherein each wide portion includes a bend, and wherein an inside bend radius of each wide portion is equal to a width of the wide portion.

12. The photon detector of claim 1, wherein the optical waveguide is positioned on a same layer as the superconducting wire.

13. A photon detector, comprising:
a superconducting wire having a plurality of alternating narrow and wide portions;
a current source electrically-coupled to the superconducting wire and configured to supply the superconducting wire with electrical current; and
an optical waveguide optically coupled to the plurality of narrow portions of the superconducting wire,
wherein:
the electrical current supplied by the current source is selected so as to maintain the superconducting wire in a superconducting state in the absence of incident photons from the optical waveguide,
the narrow portions of the superconducting wire are configured to transition from a superconducting state to a non-superconducting state in response to an incident photon from the optical waveguide, and
the wide portions are sized so as to remain in the superconducting state regardless of a state of the narrow portions.

14. The photon detector of claim 13, wherein each narrow portion of the plurality of narrow portions is straight to reduce current crowding effects within the narrow portion.

15. The photon detector of claim 13, wherein at least one wide portion of the plurality of wide portions is bent.

16. The photon detector of claim 13, wherein the narrow portions each have a first width and the wide portions each have a second width, the second width being greater than the first width.

17. The photon detector of claim 13, further comprising a readout circuit electrically-coupled to the superconducting wire and configured to measure an electrical property of the superconducting wire, wherein the electrical property is indicative of a number of photons incident to the superconducting wire.

18. The photon detector of claim 17, wherein the electrical property comprises a voltage across the superconducting wire or an impedance of the superconducting wire.

19. The photon detector of claim 18, wherein the readout circuit is configured to measure the voltage across a contact electrically-coupled in parallel with the superconducting wire.

20. The photon detector of claim 13, wherein the optical waveguide is tapered to improve coupling, such that a downstream portion of the optical waveguide is wider than an upstream portion of the optical waveguide.

21. The photon detector of claim 13, wherein the optical waveguide is vertically stacked with the superconducting wire.

22. The photon detector of claim 13, further comprising a photon source coupled to the optical waveguide and configured to probabilistically generate photons.

23. The photon detector of claim 13, wherein the optical waveguide is positioned on a same layer as the superconducting wire.

24. A photon detector, comprising:
a superconducting wire having a plurality of alternating narrow and wide portions;
a current source electrically-coupled to the superconducting wire and configured to supply the superconducting wire with electrical current; and
an optical waveguide optically coupled to the plurality of narrow portions of the superconducting wire,
wherein the superconducting wire is tapered between the narrow portions and the wide portions to reduce current crowding effects.

25. The photon detector of claim 24, wherein each narrow portion of the plurality of narrow portions is straight to reduce current crowding effects within the narrow portion.

26. The photon detector of claim 24, wherein at least one wide portion of the plurality of wide portions is bent.

27. The photon detector of claim 24, wherein the narrow portions each have a first width and the wide portions each have a second width, the second width being greater than the first width.

28. The photon detector of claim 24, further comprising a readout circuit electrically-coupled to the superconducting wire and configured to measure an electrical property of the superconducting wire, wherein the electrical property is indicative of a number of photons incident to the superconducting wire.

29. The photon detector of claim 28, wherein the electrical property comprises a voltage across the superconducting wire or an impedance of the superconducting wire.

30. The photon detector of claim 29, wherein the readout circuit is configured to measure the voltage across a contact electrically-coupled in parallel with the superconducting wire.

31. The photon detector of claim 24, wherein the optical waveguide is tapered to improve coupling, such that a downstream portion of the optical waveguide is wider than an upstream portion of the optical waveguide.

32. The photon detector of claim 24, wherein the optical waveguide is vertically stacked with the superconducting wire.

33. The photon detector of claim 24, further comprising a photon source coupled to the optical waveguide and configured to probabilistically generate photons.

34. The photon detector of claim 24, wherein the optical waveguide is positioned on a same layer as the superconducting wire.

35. A photon detector, comprising:
a superconducting wire having a plurality of alternating narrow and wide portions;
a current source electrically-coupled to the superconducting wire and configured to supply the superconducting wire with electrical current; and
an optical waveguide optically coupled to the plurality of narrow portions of the superconducting wire,
wherein:
the optical waveguide includes a plurality of coupling portions,
the optical waveguide is positioned so that a first coupling portion is separated from a first narrow portion of the superconducting wire by a first distance such that the first coupling portion is evanescently coupled to the first narrow portion, and
a second coupling portion of the plurality of coupling portions, downstream from the first coupling portion, is separated from a second narrow portion of the superconducting wire by a second distance, less than the first distance, such that a coupling efficiency between the second coupling portion and the second narrow portion is greater than a coupling efficiency between the first coupling portion and the first narrow portion.

36. The photon detector of claim 35, wherein each narrow portion of the plurality of narrow portions is straight to reduce current crowding effects within the narrow portion.

37. The photon detector of claim 35, wherein at least one wide portion of the plurality of wide portions is bent.

38. The photon detector of claim 35, wherein the narrow portions each have a first width and the wide portions each have a second width, the second width being greater than the first width.

39. The photon detector of claim 35, further comprising a readout circuit electrically-coupled to the superconducting wire and configured to measure an electrical property of the superconducting wire, wherein the electrical property is indicative of a number of photons incident to the superconducting wire.

40. The photon detector of claim 39, wherein the electrical property comprises a voltage across the superconducting wire or an impedance of the superconducting wire.

41. The photon detector of claim 40, wherein the readout circuit is configured to measure the voltage across a contact electrically-coupled in parallel with the superconducting wire.

42. The photon detector of claim 35, wherein the optical waveguide is tapered to improve coupling, such that a downstream portion of the optical waveguide is wider than an upstream portion of the optical waveguide.

43. The photon detector of claim 35, wherein the optical waveguide is vertically stacked with the superconducting wire.

44. The photon detector of claim 35, further comprising a photon source coupled to the optical waveguide and configured to probabilistically generate photons.

45. The photon detector of claim 35, wherein the optical waveguide is positioned on a same layer as the superconducting wire.

* * * * *